United States Patent
Nakagawa

(10) Patent No.: US 7,860,457 B2
(45) Date of Patent: Dec. 28, 2010

(54) WIRELESS COMMUNICATION DEVICE AND MEDIUM PROCESSING APPARATUS

(75) Inventor: Atsushi Nakagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 931 days.

(21) Appl. No.: 11/707,895

(22) Filed: Feb. 20, 2007

(65) Prior Publication Data

US 2007/0197232 A1 Aug. 23, 2007

(30) Foreign Application Priority Data

Feb. 20, 2006 (JP) ............... 2006-042715

(51) Int. Cl.
*H04B 7/00* (2006.01)
(52) U.S. Cl. .............. 455/41.2; 455/558; 455/456.1; 455/456.6; 455/1; 455/41.1; 455/41.3; 340/572.7; 340/573.3; 340/572.1; 340/10.1; 340/10.2; 340/10.31; 340/10.4; 340/10.41; 340/10.5
(58) Field of Classification Search .............. 455/41.2, 455/558, 456.1, 456.6; 340/572.7, 573.3
See application file for complete search history.

(56) References Cited

U.S. PATENT DOCUMENTS

2006/0160552 A1* 7/2006 Nakagawa

2006/0273911 A1 12/2006 Nakagawa

FOREIGN PATENT DOCUMENTS

| EP | 1 684 209 A2 | 7/2006 |
|---|---|---|
| JP | 2000-105800 | 4/2000 |
| JP | 2000-137771 | 5/2000 |
| JP | 2000-306054 | 11/2000 |
| JP | 2002-216092 | 8/2002 |
| JP | 2003-296786 | 10/2003 |
| JP | 2004-516205 A | 6/2004 |
| JP | 3579845 B2 | 7/2004 |
| JP | 2004-265113 | 9/2004 |
| KR | 10-0258006 B | 6/2000 |
| KR | 2004-0028692 A | 4/2004 |

OTHER PUBLICATIONS

Japanese Office Action dated Apr. 16, 2008 for Application. No. 10-2007-16442.
European Search Report dated Jul. 2, 2007 for Appln. No. 07002233.0-2412.

* cited by examiner

*Primary Examiner*—Patrick N Edouard
*Assistant Examiner*—Justin Y Lee
(74) *Attorney, Agent, or Firm*—Pillsbury Winthrop Shaw Pittman, LLP

(57) ABSTRACT

A wireless communication device according to embodiments includes a position detection unit configured to detect the position of the wireless communication medium in a moving path, and a control unit configured to control communication based on the detection signal from the position detection unit.

6 Claims, 12 Drawing Sheets

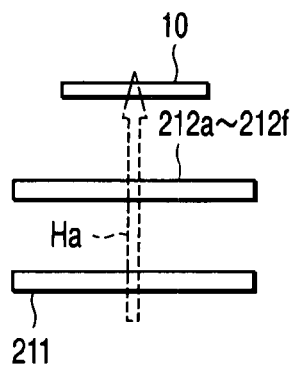
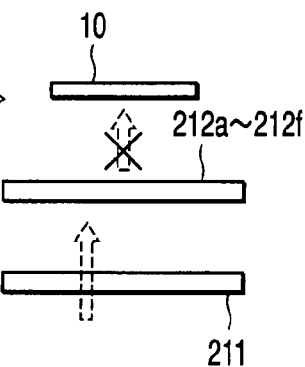
FIG. 5A  FIG. 5B  FIG. 5C
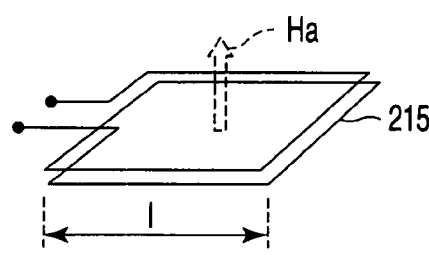
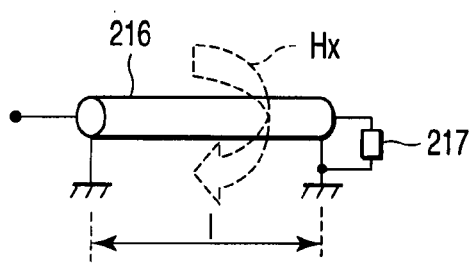
FIG. 6A  FIG. 6B

[Output level setting 1
→ incommunicable with wireless
communication medium]

[Output level setting 2
→ communicable with wireless
communication medium]

WIRELESS COMMUNICATION DEVICE AND MEDIUM PROCESSING APPARATUS

CROSS-REFERENCE TO RELATED APPLICATIONS

This application is based upon and claims the benefit of priority from prior Japanese Patent Application No. 2006-042715, filed Feb. 20, 2006, the entire contents of which are incorporated herein by reference.

BACKGROUND OF THE INVENTION

1. Field of the Invention

The invention relates to a wireless communication device such as a wireless tag reader or noncontact IC card reader which communicates with a wireless communication medium such as a wireless tag or noncontact IC card by using an electromagnetic wave. For example, the invention relates to a wireless communication device applied to a medium processing apparatus which continuously processes wireless communication media such as securities, mail, and pass tickets at high speed. The invention also relates to a medium processing apparatus to which the wireless communication device is applied to sort and check wireless communication media.

2. Description of the Related Art

Jpn. Pat. Appln. KOKAI Publication No. 2003-296786 discloses an example of a wireless communication device which processes a wireless communication medium conveyed through a conveying path. Jpn. Pat. Appln. KOKAI Publication Nos. 2000-105800 and 2002-216092 disclose a technique in which a medium processing apparatus to which a wireless communication device is applied reads data and the like from a wireless communication medium to process it.

However, when continuously processing wireless communication media at high speed, e.g., when starting transmission of a command to the second wireless communication medium which enters the communication area of a wireless communication device while transmitting a command to the first wireless communication medium which has entered the communication area of the wireless communication device, these two signals (commands) interfere with each other, thereby disabling normal transmission to the first and second wireless communication media. As a result, the wireless communication media continuously conveyed at high speed cannot be appropriately processed, thus posing a problem.

BRIEF SUMMARY OF THE INVENTION

It is an object of the invention to provide a wireless communication device and medium processing apparatus which can advantageously process wireless communication media continuously conveyed at high speed.

According to an aspect of the invention, a wireless communication device comprises a position detection unit configured to detect a position of the wireless communication medium in a moving path, and a control unit configured to control communication based on a detection signal from the position detection unit.

According to another aspect of the invention, a medium processing apparatus comprises a position detection unit configured to detect a position of the wireless communication medium in a moving path, a control unit configured to control communication based on a detection signal from the position detection unit, and a processing unit configured to process the wireless communication medium based on wireless communication medium identification information received from the wireless communication medium upon communication control processing executed by the control unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given blow, serve to explain the principles of the invention.

FIGS. 5A to 5C are schematic views for explaining the operations of the magnetic field control coil according to the first embodiment;

FIGS. 6A and 6B are schematic views for explaining the arrangements of the communication antennas according to the first embodiment;

DETAILED DESCRIPTION OF THE INVENTION

Embodiments of the invention will be described below with reference to the accompanying drawing.

Each embodiment describes a form in which a wireless communication medium using the 2.45-GHz band receives power by an electromagnetic wave from a wireless communication device without any built-in battery.

Figure 1:
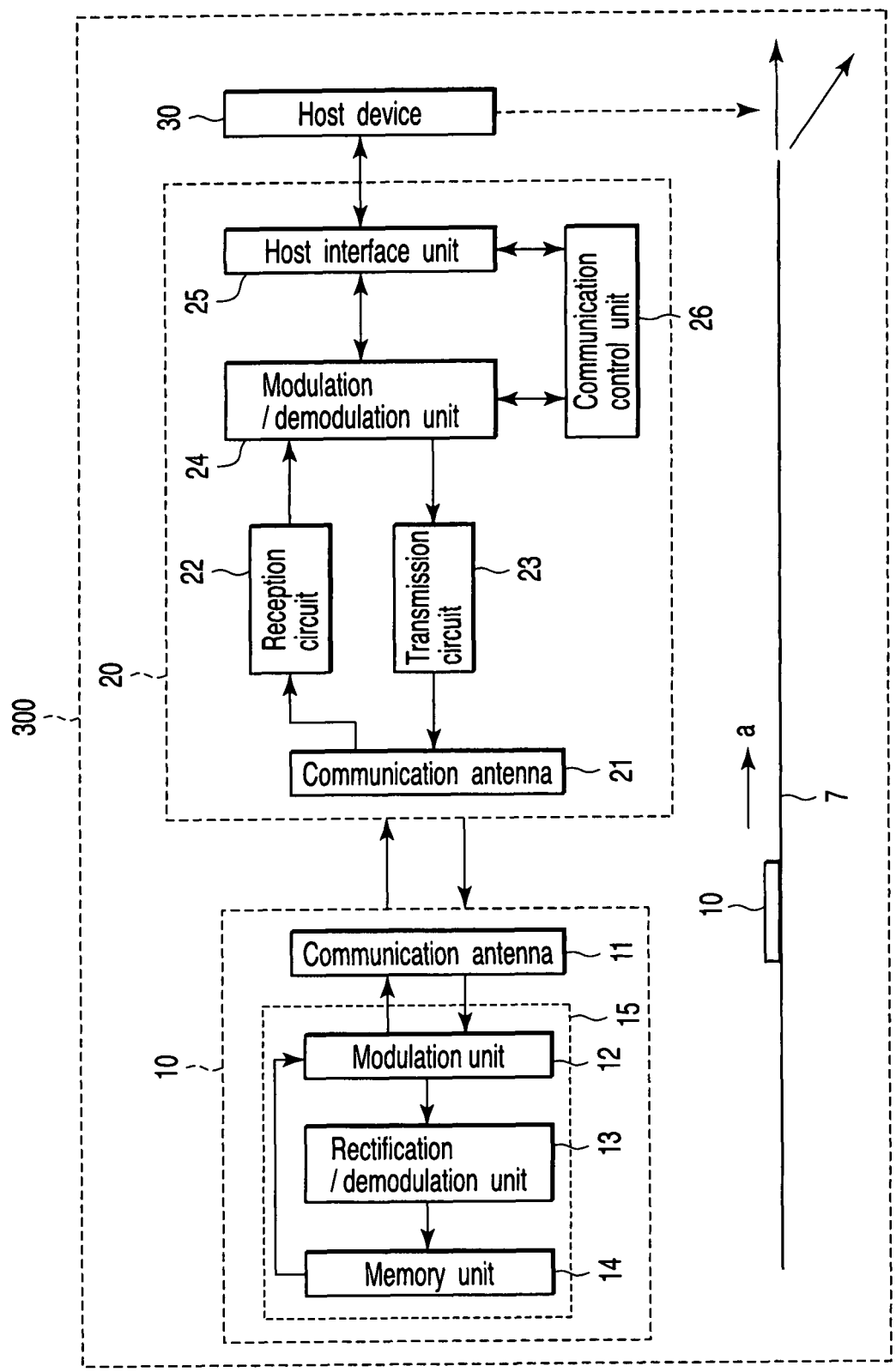
FIG. 1 is a block diagram schematically showing the basic arrangements of a wireless communication medium, wireless communication device, and medium processing apparatus according to embodiments.

First, the basic arrangements of the wireless communication medium, the wireless communication device, and a medium processing apparatus will be described below with reference to FIG. 1.

A wireless communication medium 10 will be first described. The wireless communication medium 10 includes a communication antenna 11, modulation unit 12, rectification/demodulation unit 13, and memory unit 14. An IC chip 15 includes the modulation unit 12, rectification/demodulation unit 13, and memory unit 14.

When the wireless communication medium 10 is conveyed and enters a communication area of a wireless communication device 20, the communication antenna 11 receives an electromagnetic wave from an antenna 21 of the wireless communication device 20. The rectification/demodulation unit 13 rectifies the received electromagnetic wave, and converts it into a direct current to obtain the operation power of the wireless communication medium 10.

The wireless communication medium 10 changes to an operable state upon reception of this generated operation power. The wireless communication medium 10 then receives a polling command (wireless communication signal) from the wireless communication device 20, and transmits preset data (e.g., the identification information which identifies the wireless communication medium 10) from the memory unit 14. The modulation unit 12 modulates this preset data, and transmits it as an electromagnetic wave to the wireless communication device 20 via the communication antenna 11. Note that the above-described polling command is defined as a stored data transmission command to be transmitted to the wireless communication medium.

The wireless communication device 20 will be described below. The wireless communication device 20 includes a communication antenna 21, reception circuit 22, transmission circuit 23, modulation/demodulation unit 24, host interface unit 25, and communication control unit 26.

When the host interface unit 25 receives a command transmission instruction from a control apparatus (a host device 30 such as a host computer) in a medium processing apparatus 300, the communication control unit 26 generates a transmission command, and transmits it to the modulation/demodulation unit 24. The modulation/demodulation unit 24 modulates a carrier signal, and then the transmission circuit 23 amplifies the modulated signal and transmits it as an electromagnetic wave to the wireless communication medium 10 via the communication antenna 21.

The communication antenna 21 of the wireless communication device 20 receives the signal returned from the communication antenna 11 of the wireless communication medium 10. The reception circuit 22 amplifies the received signal detected from the carrier signal, and the modulation/demodulation unit 24 demodulates it. The communication control unit 26 executes error check processing for the demodulated signal, and transmits it to the host device 30 via the host interface unit 25.

As described above, the wireless communication device 20 can read data from the memory unit 14 of the wireless communication medium 10 in a noncontact manner.

The medium processing apparatus 300 controls the conveying process and the like of the wireless communication medium 10 based on the data (identification information) read from the wireless communication medium 10 by the wireless communication device 20.

The first embodiment of the invention will be described below.

Figure 2:
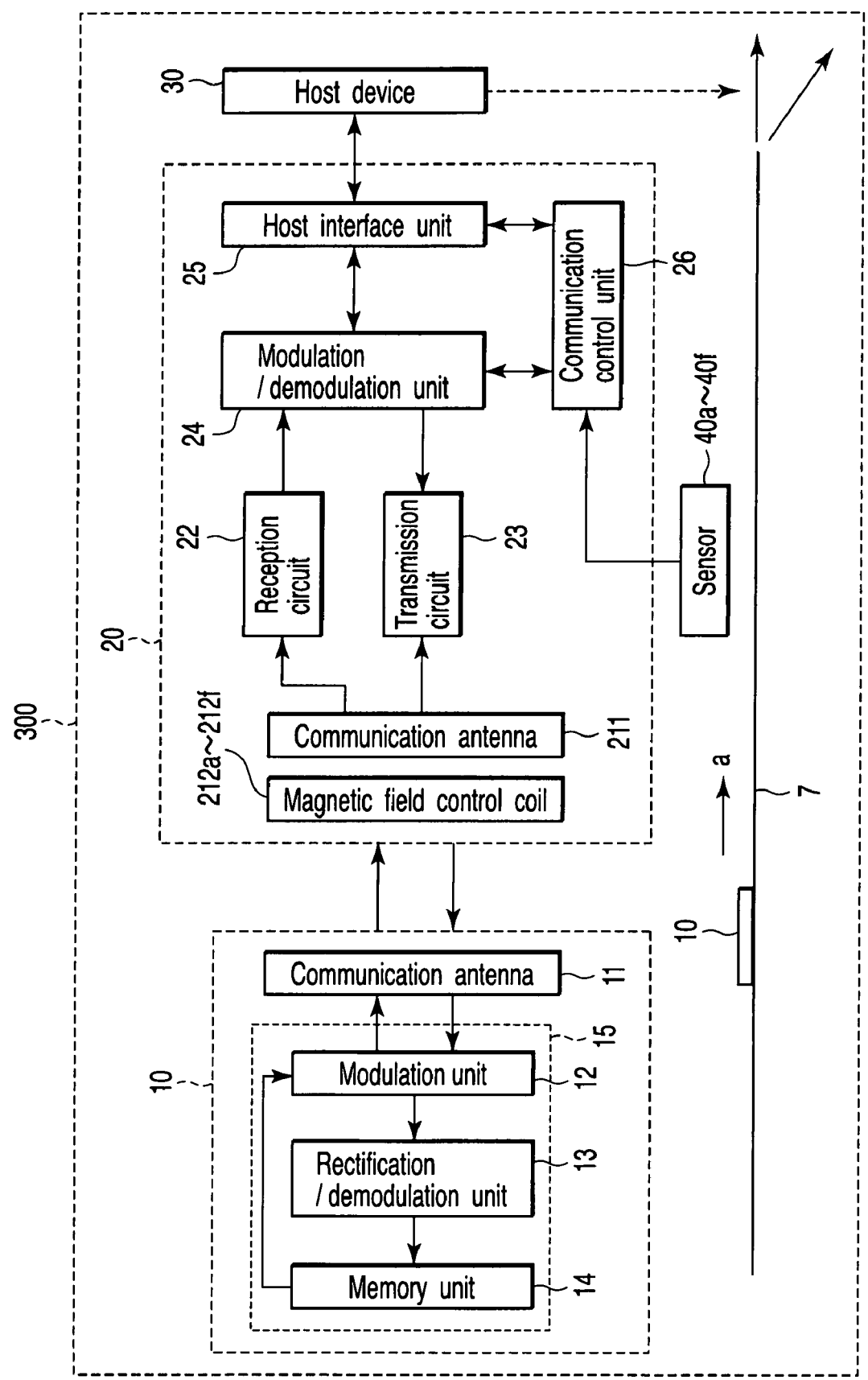
FIG. 2 is a block diagram schematically showing the arrangements of a wireless communication medium, wireless communication device, and medium processing apparatus according to the first embodiment.

FIG. 2 is a block diagram schematically showing the arrangements of a wireless communication medium, wireless communication device, and medium processing apparatus according to the first embodiment. Note that the same reference numerals as in FIG. 1 denote the same parts in FIG. 2, a description thereof will be omitted, and only different parts will be shown and described below. In the first embodiment, the communication area of a wireless communication device 20 is divided into six areas.

In reading data from the wireless communication medium, the medium processing apparatus needs to read the data from the wireless communication medium which moves at high speed. In order to implement such function, the basic arrangement according to the first embodiment is different from that in FIG. 1 in that a communication antenna 211, a plurality of (in this case, six) magnetic field control coils 212a to 212f, and a plurality of (in this case, six) passage detection sensors 40a to 40f serving as position detection means are used.

Figure 3:
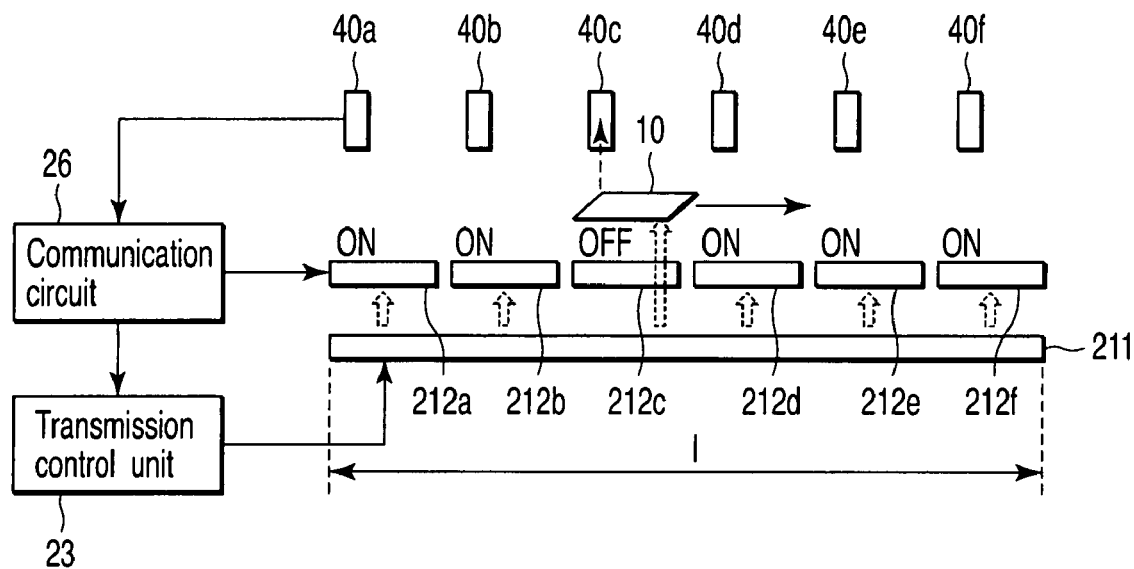
FIG. 3 is a schematic view for explaining the arrangement states of a communication antenna, magnetic field control coils, and passage detection sensors according to the first embodiment.

For example, as shown in FIG. 3, the communication antenna 211 having a predetermined length l in the moving direction (conveying direction) of a wireless communication medium 10 is arranged parallel to a moving path (conveying path 7) of the wireless communication medium 10, and connected to a transmission circuit 23 to transmit a command to the wireless communication medium 10. Note that the length l [m] of the communication antenna 211 in the moving direction of the wireless communication medium 10 is equal to or greater than that given by $$l = v \times t$$

where v [m/s] is the conveying speed in the conveying path 7, i.e., the moving speed of the wireless communication medium 10, and t [s] is a time required for communication between the wireless communication device 20 and the wireless communication medium 10.

Each of the plurality of (in this case, six) magnetic field control coils 212a to 212f is used to control a magnetic field from the communication antenna 211 in each communication area. For example, as shown in FIG. 3, the magnetic field control coils 212a to 212f are arranged at predetermined intervals along the moving path between the communication antenna 211 and the moving path (conveying path 7) of the wireless communication medium 10. The coils 212a to 212f each are connected to the communication control unit 26.

Each of the plurality of (in this case, six) passage detection sensors 40a to 40f is used to specify the passage position of the wireless communication medium 10 which is passing through the communication area. For example, as shown in FIG. 3, the passage detection sensors 40a to 40f are disposed along the moving path (conveying path 7) of the wireless communication medium 10 at predetermined intervals, and each connected to the communication control unit 26.

As shown in FIG. 3, the arrangement positions of the magnetic field control coils 212a to 212f correspond to those of the passage detection sensors 40a to 40f in a one-to-one correspondence.

In the above arrangement, when the wireless communication medium 10 enters the communication area of the wireless communication device 20, the passage detection sensors 40a to 40f sequentially detect the arrangement positions of the wireless communication medium 10, and transmit passage detection signals (passage position signals) to the communication control unit 26. The correspondence between the plurality of passage detection sensors 40a to 40f and magnetic field control coils 212a to 212f is set in the communication control unit 26 in advance. Based on the setting content, the communication control unit 26 transmits a control signal to the magnetic field control coil corresponding to the passage detection sensor which has detected the passage detection signal. The communication control unit 26 simultaneously instructs the transmission circuit 23 to transmit a communication command, thereby starting transmission of the communication command.

With these processes, the communication control unit 26 sequentially transmits the control signals to the magnetic field control coils 212a to 212f based on the passage detection signals detected by the passage detection sensors 40a to 40f along with the movement of the wireless communication medium 10. The communication antenna 211 of the wireless communication device 20 then transmits a communication command only in an area through which the wireless communication medium 10 is passing.

The magnetic field control method implemented by the above magnetic field control coils 212a to 212f will be described below in detail with reference to FIG. 4 and FIGS. 5A to 5C.

The communication antenna 211 is connected to the transmission circuit 23, and generates a magnetic field Ha from the communication antenna 211 based on an AC signal output from the transmission circuit 23 and having a frequency for use in wireless communication.

Figure 4:
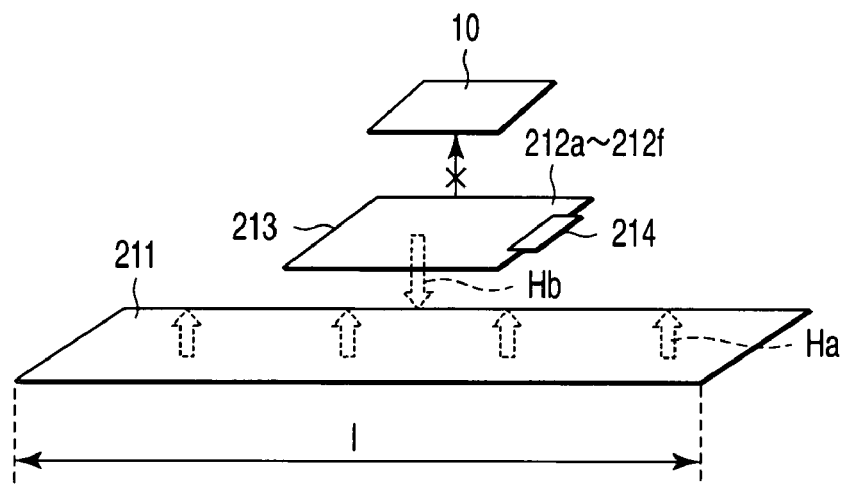
FIG. 4 is a schematic view for explaining the operation of the magnetic field control coil according to the first embodiment.

For example, as shown in FIG. 4, a magnetic field control coil 212 includes a loop coil 213 and an open/close switch 214, and is arranged in parallel above the communication antenna 211 across a predetermined gap. When the wireless communication medium 10 is present above the magnetic field control coil 212 as shown in FIG. 5, the magnetic field Ha generated by the communication antenna 211 is directly applied to the wireless communication medium 10 if the open/close switch 214 of the magnetic field control coil 212 is open.

On the other hand, if the open/close switch 214 of the magnetic field control coil 212 is closed based on the instruction from the communication control unit 26 as shown in FIG. 5B, a magnetic field Hb in a direction opposite to the magnetic field Ha is generated. As a result, the magnetic fields Ha and Hb are cancelled out, thereby preventing the magnetic field Ha from being applied from the communication antenna 211 to the wireless communication medium 10 as shown in FIG. 5C.

In the above arrangement, on/off control of the magnetic field Ha from the communication antenna 211 to the magnetic field control coil 212 can be performed along with the movement (position) of the wireless communication medium 10 which is passing through each communication area of the wireless communication device 20.

Note that, as shown in FIG. 6A, the communication antenna 211 may use the magnetic field Ha which is generated by a loop coil 215 of an LC resonance circuit in a direction perpendicular to the surface including the loop coil 215. As shown in FIG. 6B, the communication antenna 211 may also use a magnetic field Hx concentrically generated about a coaxial cable 216 in a state wherein a far end opposing the signal input side of the coaxial cable 216 is terminated by a resistor 217 having the same impedance as a line impedance, and an external conductor is grounded at both terminals of the coaxial cable 216.

The loop coil 213 of the magnetic field control coil 212 has a plurality of turns in order to increase a generated magnetic field. However, when the loop patterns are close to each other as shown in FIG. 7A, the plurality of loops constituted by the plurality of turns are combined, thereby decreasing the generated magnetic field.

Figures 7A, 7B, 7C:
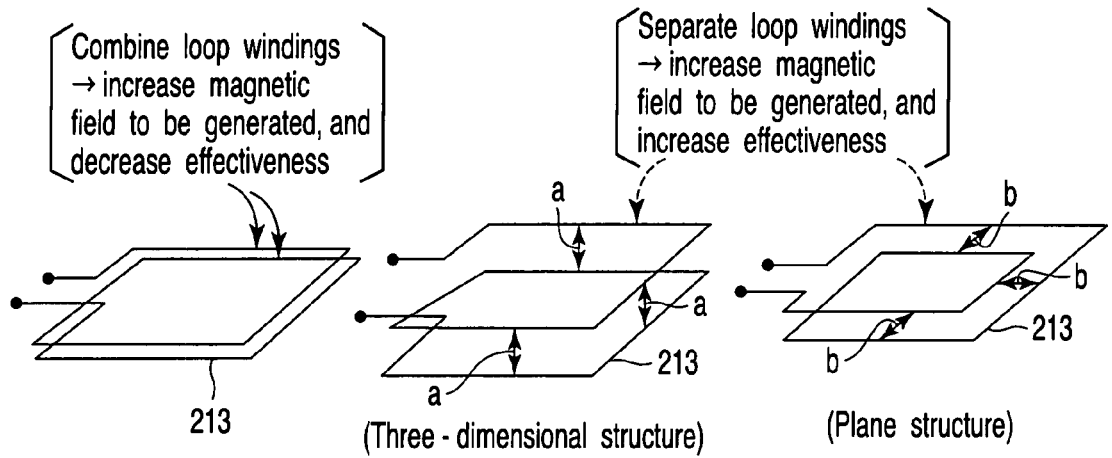
FIGS. 7A to 7C are schematic views for explaining the arrangements of the magnetic field control coils according to the first embodiment.

To cope with this problem, in this embodiment, for example, the loops constituted by the plurality of turns are separated from each other by a gap a, and formed in the direction perpendicular to the surface including the loops as shown in FIG. 7B. Otherwise, as shown in FIG. 7C, the plurality of loops constituted by the plurality of turns are separated from each other by a gap b and formed in the same plane including the loop, thereby increasing the generated magnetic field. As a result, these arrangements can effectively act on a magnetic field suppressing function.

The open/close switch 214 of the magnetic field control coil 212 can have an arrangement in which a mechanical relay capable of controlling the on/off operation is used, or an arrangement in which a semiconductor relay (e.g., a photo-MOS relay) is used in consideration of the contact life of the open/close switch 214 because many on/off operations must be performed in accordance with an application purpose.

The second embodiment of the invention will be described next.

The second embodiment is applied when a plurality of wireless communication media 10 are present in the communication area of a wireless communication device 20, and will be described below in detail.

Figure 8:
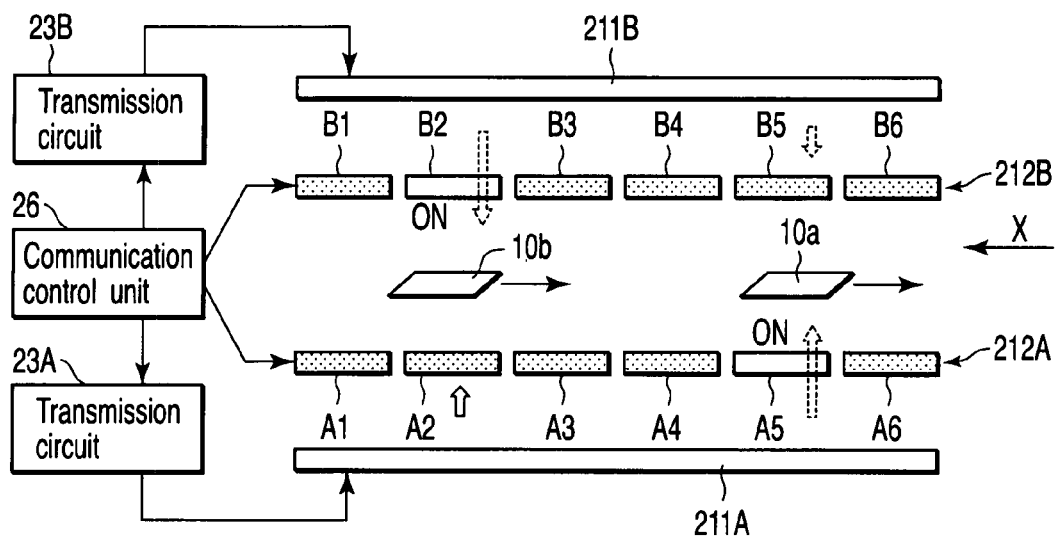
FIG. 8 is a view schematically showing the main parts of a wireless communication device and medium processing apparatus according to the second embodiment.

FIG. 8 is a view schematically showing the arrangements of the wireless communication device and a medium processing apparatus according to the second embodiment. The description of the same parts as in FIG. 2 will be omitted, and only different parts will be shown and described below. In this embodiment, the communication area of the wireless communication device 20 is divided into six areas.

The arrangement according to the second embodiment is different from that in FIG. 2 in that two transmission circuits 23A and 23B, two communication antennas 211A and 211B, and two magnetic field control coil groups 212A and 212B are used. Note that passage detection sensors 40a to 40f are not shown in FIG. 8.

For example, as shown in FIG. 8, the two communication antennas 211A and 211B each having a predetermined length in the moving direction (conveying direction) of the wireless communication medium 10 as the above-described communication antenna 211 are arranged in parallel on opposite sides of a moving path (conveying path 7) of the wireless communication medium 10, and respectively connected to the transmission circuits 23A and 23B to transmit commands to wireless communication media 10a and 10b.

For example, as shown in FIG. 8, one magnetic field control coil group 212A is arranged between one communication antenna 211A and the moving path (conveying path 7) of the wireless communication media 10a and 10b, and includes a plurality of (in this case, six) magnetic field coils A1 to A6 arranged at predetermined intervals along the moving path. The magnetic field control coils A1 to A6 each are connected to a communication control unit 26.

As shown in FIG. 8, the other magnetic field control coil group 212B is arranged between the other communication antenna 211B and the moving path (conveying path 7) of the wireless communication media 10a and 10b, and includes a plurality of (in this case, six) magnetic field control coils B1 to B6 arranged at predetermined intervals along the moving path. The magnetic field control coils B1 to B6 each are connected to the communication control unit 26.

The arrangements of the magnetic field control coils A1 to A6 and B1 to B6 are the same as those of the magnetic field control coils 212a to 212f shown in FIG. 3.

In the above arrangement, when the passage detection sensor 40a detects the first wireless communication medium 10a which enters the communication area of the wireless communication device 20, the communication control unit 26 instructs the transmission circuit 23A to start transmission of a communication command, and simultaneously instructs the magnetic field control coil A1 of the magnetic field control coil group 212A to turn off an open/close switch 214. The communication control unit 26 then sequentially controls the operations of the magnetic field control coils A2 to A6 of the magnetic field control coil group 212A based on passage detection signals respectively output from the passage detection sensors 40b to 40f along with the movement of the wireless communication medium 10a.

Subsequently, when the next wireless communication medium 10b enters the communication area of the wireless communication device 20, upon reception of a passage detection signal from the passage detection sensor 40a, the communication control unit 26 instructs the transmission circuit 23B to transmit a communication command, and simultaneously instructs the magnetic field control coil B1 of the magnetic field control coil group 212B to turn off the open/close switch 214. The communication control unit 26 then sequentially controls the operations of the magnetic field control coils B2 to B6 of the magnetic field control coil group 212B in accordance with the passage detection signals respectively output from the passage detection sensors 40b to 40f along with the movement of the wireless communication medium 10b.

Figure 10:
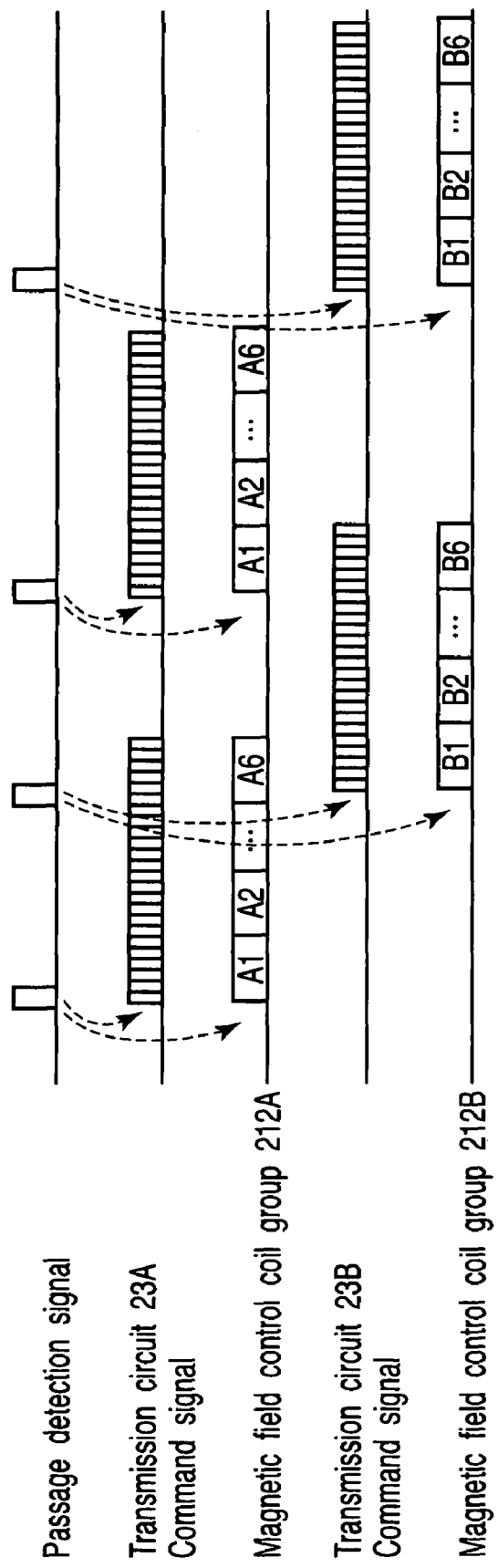
FIG. 10 is a timing chart for explaining an operation according to the second embodiment.

As shown in a timing chart shown in FIG. 10, whenever the wireless communication medium 10a or 10b enters the communication area of the wireless communication device 20, the communication control unit 26 alternatively instructs the transmission circuits 23A and 23B to transmit communication commands. Simultaneously, the communication control unit 26 alternatively instructs the magnetic field control coil groups 212A and 212B to open/close the open/close switches 214.

Figure 9:
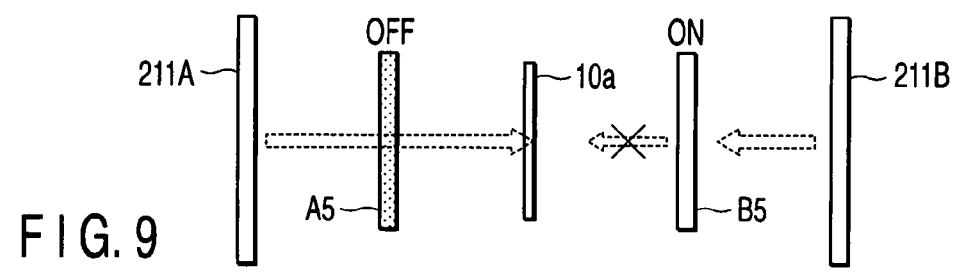
FIG. 9 is a schematic view for explaining the operation of a magnetic field control coils according to the second embodiment viewed from the direction of an arrow X shown in FIG. 8.

With the above arrangement and operation, as shown in FIG. 8, when the wireless communication medium 10a is conveyed to a position close to the magnetic field control coil A5 of the magnetic field control coil group 212A, and the wireless communication medium 10b is conveyed to a position close to the magnetic field control coil A2 of the magnetic field control coil group 212A, the open/close switch 214 of the magnetic field control coil A5 in the magnetic field control coil group 212A is off, but the open/close switch 214 of the magnetic field control coil B5 in the magnetic field control coil group 212B is on. Hence, as shown in FIG. 9, only a communication command from the communication antenna 211A is transmitted to the wireless communication medium 10a, but a communication command from the communication antenna 211B is not transmitted to the wireless communication medium 10a.

Similarly, the open/close switch 214 of the magnetic field control coil A2 in the magnetic field control coil group 212A is on, but the open/close switch 214 of the magnetic field control coil B2 in the magnetic field control coil group 212B is off. Hence, only a communication command from the communication antenna 211B is transmitted to the wireless communication medium 10b, but a communication command from the communication antenna 211A is not transmitted to the wireless communication medium 10b.

As described above, the magnetic fields applied from the communication antennas 211A and 211B are controlled by switching the magnetic field control coil groups 212A and 212B along with the movements of the wireless communication media 10a and 10b. Therefore, the wireless communication device 20 can accurately transmit communication commands to the two wireless communication media 10a and 10b present in the respective communication areas.

The third embodiment of the invention will be described next.

The third embodiment is a modification to the second embodiment, and will be described below in detail.

Figure 11:
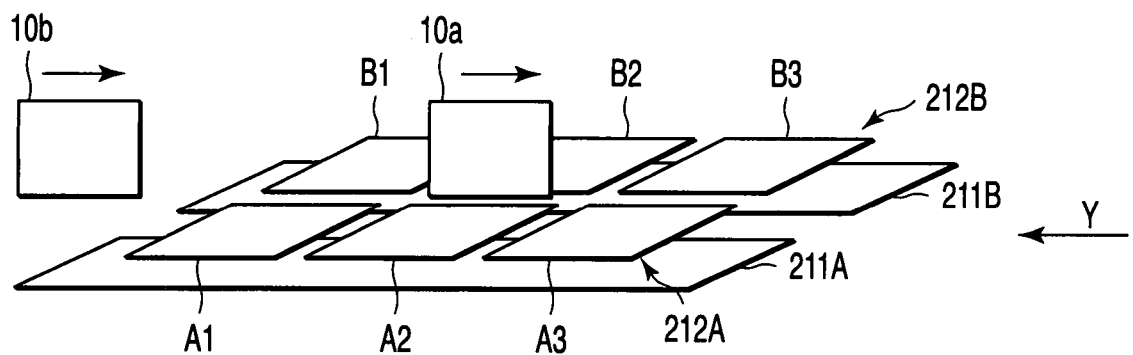
FIG. 11 is a view schematically showing the main parts of a wireless communication device and medium processing apparatus according to the third embodiment.

FIG. 11 is a view schematically showing the arrangements of a wireless communication device and medium processing apparatus according to the third embodiment. The description of the same parts as in FIG. 2 will be omitted, and only different parts will be shown and described below. In this embodiment, wireless communication media 10a and 10b are flat, and the communication area of a wireless communication device 20 is divided into three areas.

The arrangement according to the third embodiment is different from that in FIG. 2 in that two transmission circuits 23A and 23B, two communication antennas 211A and 211B, two magnetic field control coil groups 212A and 212B, and three passage detection sensors 40a to 40c are used. Note that the transmission circuits 23A and 23B and the passage detection sensors 40a to 40c are not shown in FIG. 11.

For example, as shown in FIG. 11, the two communication antennas 211A and 211B each having a predetermined length in the moving direction (conveying direction) of the wireless communication media 10a and 10b as the above-described communication antenna 211 are arranged in parallel in the same plane on opposite sides of a moving path (conveying path 7) of the wireless communication media 10a and 10b, and respectively connected to the transmission circuits 23A and 23B to transmit commands to wireless communication media 10a and 10b.

For example, as shown in FIG. 11, one magnetic field control coil group 212A is arranged in parallel above one communication antenna 211A, and includes a plurality of (in this case, three) magnetic field coils A1 to A3 arranged at predetermined intervals along the moving path. The magnetic field control coils A1 to A3 each are connected to a communication control unit 26.

As shown in FIG. 11, the other magnetic field control coil group 212B is arranged in parallel above the other communication antenna 211B, and includes a plurality of (in this case, three) magnetic field control coils B1 to B3 arranged at predetermined intervals along the moving path. The magnetic field control coils B1 to B3 each are connected to the communication control unit 26.

Figure 12:
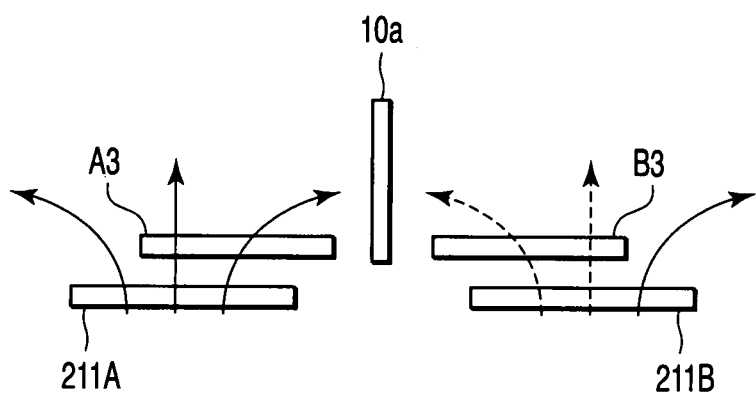
FIG. 12 is a schematic view for explaining the operations of a magnetic field control coils according to the third embodiment viewed from the direction of an arrow Y shown in FIG. 11.

As shown in FIGS. 11 and 12, the flat wireless communication media 10a and 10b move between the two communication antennas 211A and 211B (two magnetic field control coil groups 212A and 212B) in a state perpendicular to the plane including the communication antennas 211A and 211B.

In the above arrangement, communication can be performed when the magnetic field required for communication with the wireless communication media 10a and 10b is applied from the wireless communication device 20 to a communication antenna 11 of each of the wireless communication media 10a and 10b.

That is, when the passage detection sensor 40a detects the first wireless communication medium 10a which enters the communication area of the wireless communication device 20, the communication control unit 26 instructs the transmission circuit 23A to start transmission of a communication command, and simultaneously instructs the magnetic field control coil A1 of the magnetic field control coil group 212A to turn off an open/close switch 214. The communication control unit 26 then sequentially controls the operations of the magnetic field control coils A2 and A3 of the magnetic field control coil group 212A based on passage detection signals respectively output from the passage detection sensors 40b and 40c along with the movement of the wireless communication medium 10a.

Subsequently, when the next wireless communication medium 10b enters the communication area of the wireless communication device 20, upon reception of a passage detection signal from the passage detection sensor 40a, the communication control unit 26 instructs the transmission circuit 23B to transmit a communication command, and simultaneously instructs the magnetic field control coil B1 of the magnetic field control coil group 212B to turn off the open/close switch 214. The communication control unit 26 then sequentially controls the operations of the magnetic field control coils B2 and B3 of the magnetic field control coil group 212B in accordance with the passage detection signals respectively output from the passage detection sensors 40b and 40c along with the movement of the wireless communication medium 10b.

As described above, the communication control unit 26 alternatively instructs the transmission circuits 23A and 23B to transmit communication commands whenever the wireless communication medium 10a or 10b enters the communication areas of the wireless communication device 20. Also, the communication control unit 26 alternatively instructs the magnetic field control coil groups 212A and 212B to open/close the open/close switches 214.

With the above arrangement and operation, when the wireless communication medium 10a is conveyed to a position close to the magnetic field control coil A3 of the magnetic field control coil group 212A, and the wireless communication medium 10b is conveyed to a position close to the magnetic field control coil A1 of the magnetic field control coil group 212A, the open/close switch 214 of the magnetic field control coil A3 in the magnetic field control coil group 212A is off, but the open/close switch 214 of the magnetic field control coil B3 in the magnetic field control coil group 212B is on. Hence, as shown in FIG. 12, only a communication command from the communication antenna 211A is transmitted to the wireless communication medium 10a, but a communication command from the communication antenna 211B is not transmitted to the wireless communication medium 10a.

Also, the open/close switch 214 of the magnetic field control coil A1 in the magnetic field control coil group 212A is on, but the open/close switch 214 of the magnetic field control coil B1 in the magnetic field control coil group 212B is off. Hence, only a communication command from the communication antenna 211B is transmitted to the wireless communication medium 10b, but a communication command from the communication antenna 211A is not transmitted to the wireless communication medium 10b.

As described above, the magnetic fields applied from the communication antennas 211A and 211B are controlled by switching the magnetic field control coil groups 212A and 212B along with the movements of the wireless communication media 10a and 10b. Therefore, the wireless communication device 20 can accurately transmit communication commands to the two wireless communication media 10a and 10b present in the communication areas, respectively.

The fourth embodiment of the invention will be described next.

The fourth embodiment is also applied when a plurality of wireless communication media 10 are present in the communication areas of a wireless communication device 20, and will be described below in detail.

Figure 13:
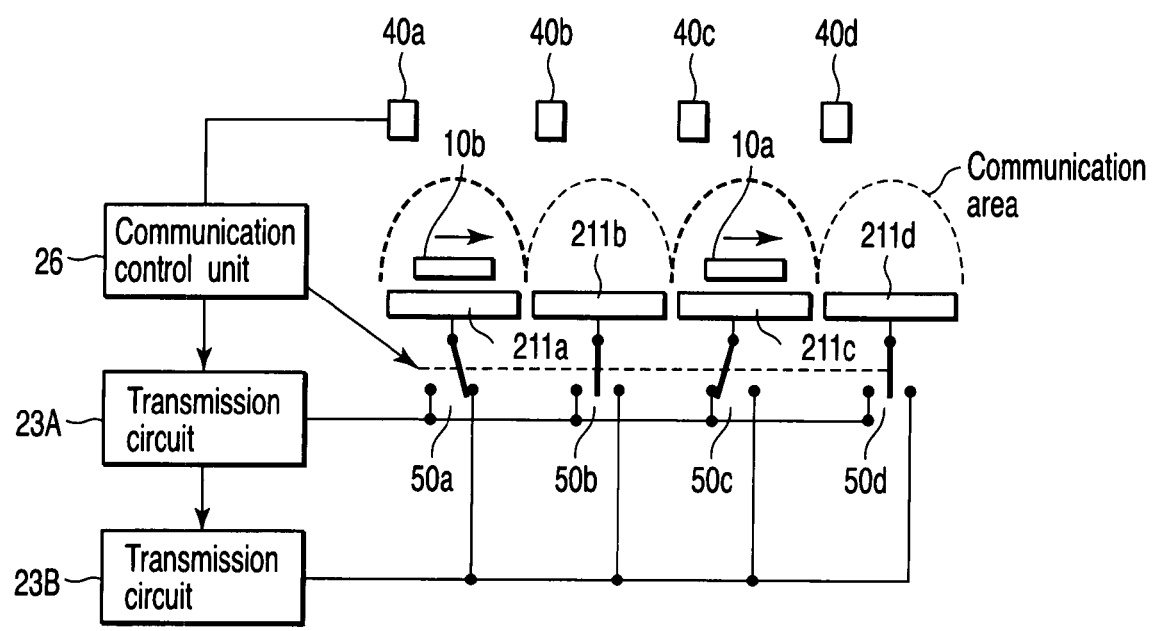
FIG. 13 is a view schematically showing the main parts of a wireless communication device and medium processing apparatus according to the fourth embodiment.

FIG. 13 is a view schematically showing the arrangements of the wireless communication device and a medium processing apparatus according to the fourth embodiment. The description of the same parts as in FIG. 2 will be omitted, and only different parts will be shown and described below. In this embodiment, the communication area of the wireless communication device 20 is divided into four areas.

The arrangement according to the fourth embodiment is different from that in FIG. 2 in that two transmission circuits 23A and 23B, a plurality of (in this case, four) communication antennas 211a to 211d, four passage detection sensors 40a to 40d, and four changeover switches 50a to 50d are used.

Note that each of the changeover switches 50a to 50d has three states, i.e., two contact connecting states and one non-connecting state, and is set in the nonconnecting state as an initial state.

As shown in FIG. 13, for example, the plurality of (in this case, four) communication antennas 211a to 211d are arranged at predetermined intervals along the moving path (conveying path 7) of wireless communication media 10a and 10b. Each of the communication antennas 211a to 211d is connected to one transmission circuit 23A via its one switching point, and also connected to the other transmission circuit 23B via the other switching point to transmit a command to the wireless communication medium 10a or 10b.

Figure 14:
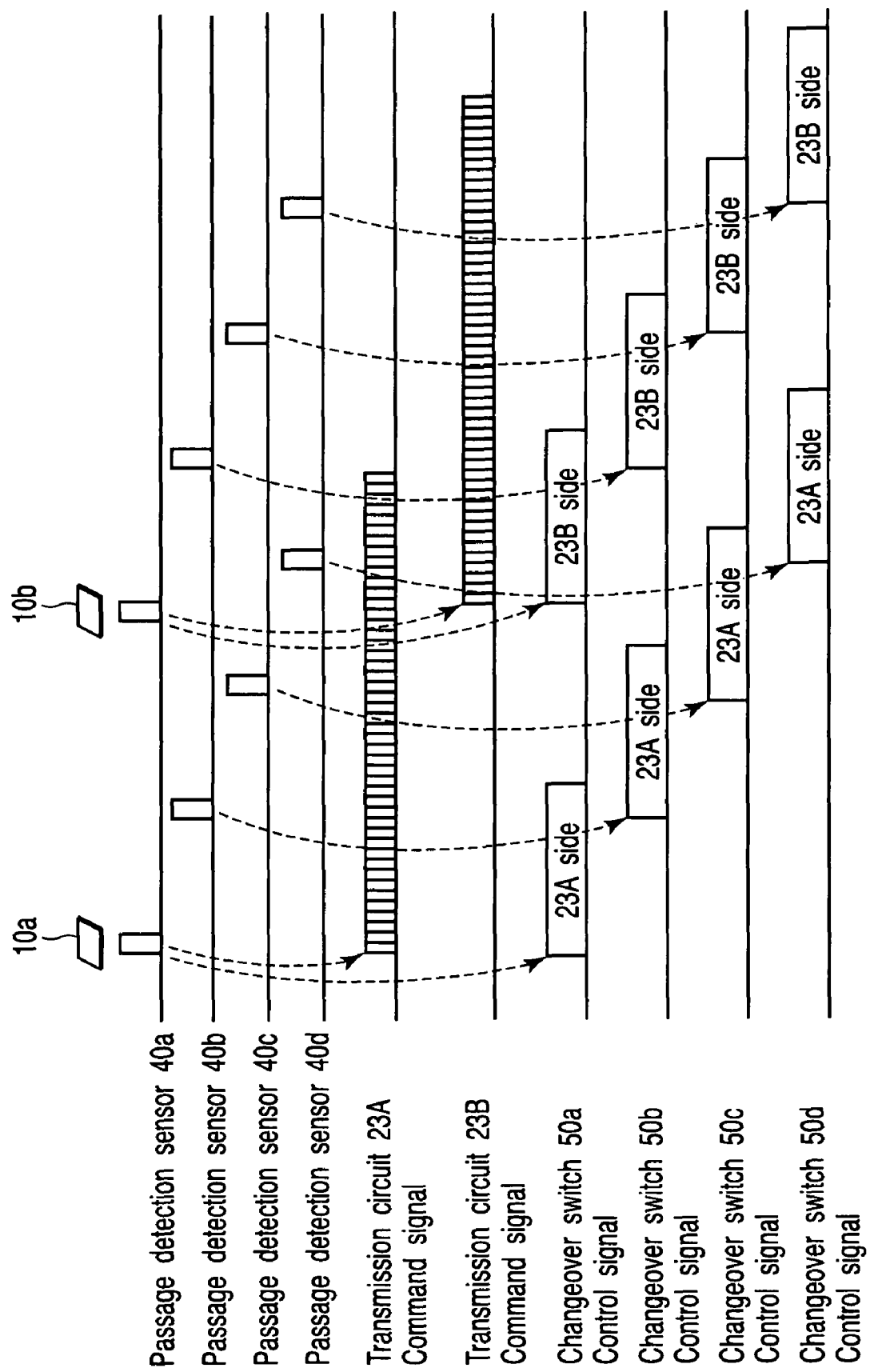
FIG. 14 is a timing chart for explaining an operation according to the fourth embodiment.

The operation in the above arrangement will be described below with reference to the timing chart shown in FIG. 14. When the passage detection sensor 40a detects the first wireless communication medium 10a which enters the communication area of the wireless communication device 20, a communication control unit 26 instructs the transmission circuit 23A to transmit a communication command. The communication control unit 26 simultaneously controls to switch the changeover switch 50a to connect it to the transmission circuit 23A. After that, the changeover switches 50b, 50c, and 50d are sequentially switched and connected to the transmission circuit 23A along with the movement of the wireless communication medium 10a.

When the passage detection sensor 40a detects the subsequent wireless communication medium 10b which enters the communication area of the wireless communication device 20 while the wireless communication medium 10a is passing, the communication control unit 26 receives a passage detection signal from the passage detection sensor 40a, and instructs the transmission circuit 23B to start transmission of a communication command. The communication control unit 26 simultaneously controls to switch the changeover switch 50a to connect it to the transmission circuit 23B. After that, the changeover switches 50b, 50c, and 50d are sequentially switched and connected to the transmission circuit 23B along with the movement of the wireless communication medium 10b.

With the above arrangement and operation, the wireless communication device 20 can accurately transmit the communication commands to the two wireless communication media 10a and 10b in the communication areas by sequentially switching the communication antennas 211a to 211d along with the movement of the wireless communication media 10a and 10b.

The fifth embodiment of the invention will be described below.

Figure 15:
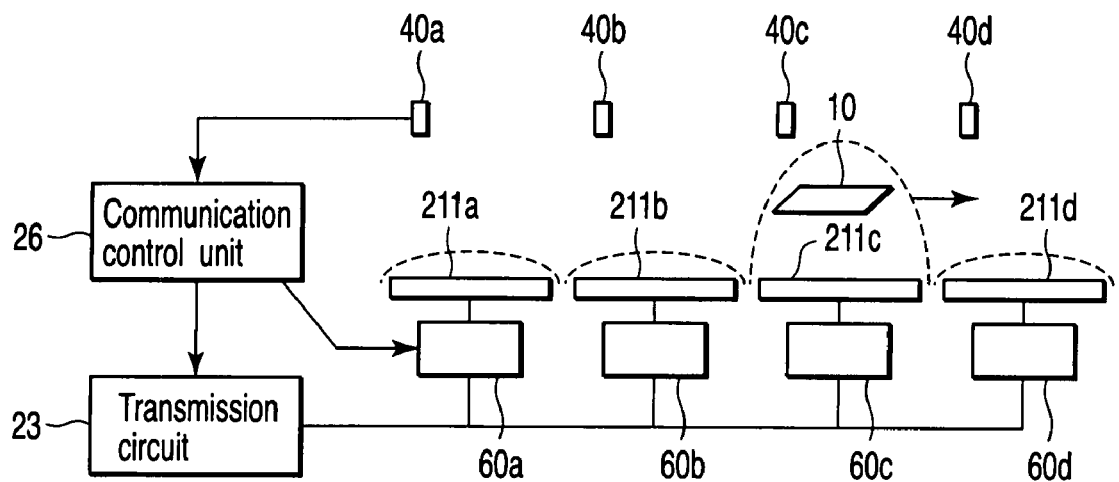
FIG. 15 is a view schematically showing the main parts of a wireless communication device and medium processing apparatus according to the fifth embodiment.

FIG. 15 is a view schematically showing the arrangements of a wireless communication device and medium processing apparatus according to the fifth embodiment. Note that the description of the same parts as in FIG. 2 will be omitted, and only different parts will be shown and described below. In this embodiment, the communication area of a wireless communication device 20 is divided into four areas.

The arrangement according to the fifth embodiment is different from that in FIG. 2 in that a plurality of (in this case, four) communication antennas 211a to 211d, four passage detection sensors 40a to 40d, and four output level adjustment units 60a to 60d serving as transmission output level adjustment means are used.

As shown in FIG. 15, the plurality of (in this case, four) communication antennas 211a to 211d are arranged at predetermined intervals along a moving path (conveying path 7) of a wireless communication medium 10, and connected to a transmission circuit 23 via the output level adjustment units 60a to 60d to transmit a command to the wireless communication medium 10.

Each of the output level adjustment units 60a to 60d has two states as output levels, i.e., a transmission level (this state is set as output level setting 1) at which a magnetic field required to operate the wireless communication medium 10 is not applied to the wireless communication medium 10 passing near each of the communication antennas 211a to 211d, and a transmission level (this state is set as output level setting 2) at which the magnetic field required to operate the wireless communication medium 10 is applied to the wireless communication medium 10. The output level adjustment units 60a to 60d are set at output level setting 1 as an initial state.

The operation in the above arrangement will be described below. When the passage detection sensor 40a detects the wireless communication medium 10 which enters the communication area of the wireless communication device 20, a communication control unit 26 instructs the transmission circuit 23 to start transmission of a communication command. The communication control unit 26 simultaneously instructs the output level adjustment unit 60a to change to transmission output level setting 2. After that, the output level settings of the output level adjustment units 60b, 60c, and 60d are sequentially switched to output level setting 2 along with the movement of the wireless communication medium 10.

Figure 16A:
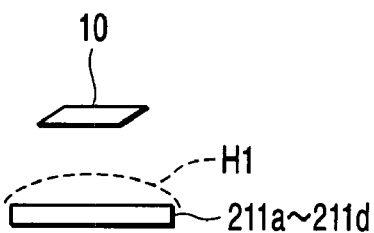
FIGS. 16A and 16B are schematic views for explaining the operations of an output level adjustment unit according to the fifth embodiment.
Figure 16B:
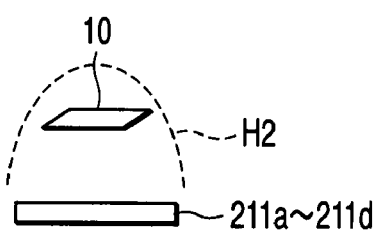

FIG. 16A shows a case wherein the output level adjustment unit 60a is set to output level setting 1. In this case, a magnetic field H1 by which the wireless communication medium 10 cannot be operated is applied, thereby disabling communication with the wireless communication medium 10. FIG. 16B shows a case wherein the output level adjustment unit 60a is set to output level setting 2. In this case, a magnetic field H2 by which the wireless communication medium 10 can be operated is applied, thereby allowing communication with the wireless communication medium 10.

With the above arrangement and operation, the wireless communication device 20 can accurately implement communication along with the movement of the wireless communication medium 10 in the communication area, by sequentially switching the transmission output levels of the output level adjustment units 60a to 60d along with the movement of the wireless communication medium 10.

The sixth embodiment of the invention will be described below.

The sixth embodiment is applied when a plurality of wireless communication media 10 are present in the communication areas of the wireless communication device 20, and will be described below in detail.

Figure 17:
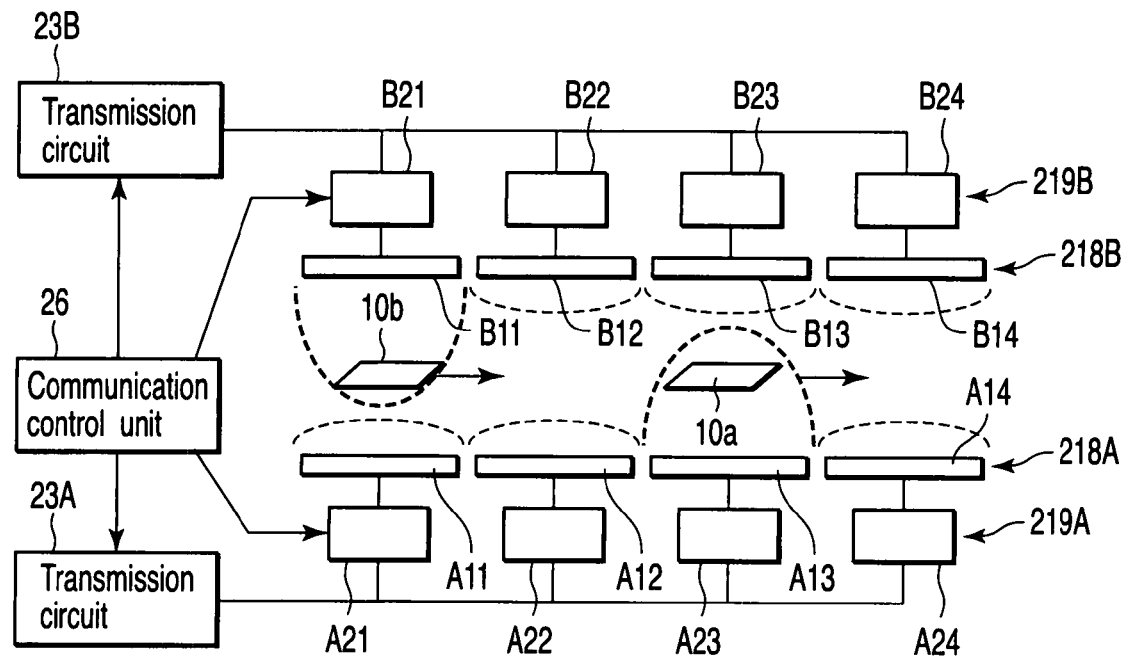
FIG. 17 is a view schematically showing the main parts of a wireless communication device and medium processing apparatus according to the sixth embodiment.

FIG. 17 is a view schematically showing the arrangements of a wireless communication device and medium processing apparatus according to the sixth embodiment. Note that the description of the same parts as in FIG. 2 will be omitted, and only different parts will be shown and described below. In this embodiment, the communication area of the wireless communication device 20 is divided into four areas.

The arrangement according to the sixth embodiment is different from that in FIG. 2 in that two transmission circuits 23A and 23B, two communication antenna groups 218A and 218B, four passage detection sensors 40a to 40d, and two output level adjustment unit groups 219A and 219B are used. The passage detection sensors 40a to 40d are not shown in FIG. 17.

As shown in FIG. 17, one communication antenna group 218A is arranged on one side of a moving path (conveying path 7) of the wireless communication medium 10, and includes a plurality of (in this case, four) communication antennas A11 to A14 arranged at predetermined intervals along the moving path. The communication antennas A11 to A14 are connected to the transmission circuit 23A via output level adjustment units A21 to A24 of the output level adjustment unit group 219A to transmit commands to a wireless communication medium 10a.

As shown in FIG. 17, the other communication antenna group 218B is arranged opposing the communication antenna group 218A on the other side of the moving path (conveying path 7) of the wireless communication medium 10, and includes a plurality of (in this case, four) communication antennas B11 to B14 arranged at predetermined intervals along the moving path. The communication antennas B11 to B14 are connected to the transmission circuit 23B via output level adjustment units B21 to B24 of the output level adjustment unit group 219B to transmit commands to a wireless communication medium 10b.

The output level adjustment units A21 to A24 and B21 to B24 have the same functions as those of the output level adjustment units 60a to 60d shown in FIG. 15.

The operation in the above arrangement will be described below. Assume that all the output level adjustment units A21 to A24 and B21 to B24 of the output level adjustment unit groups 219A and 219B are set to output level setting 1.

When the passage detection sensor 40a detects the first wireless communication medium 10a which enters the communication area of the wireless communication device 20, a communication control unit 26 instructs the transmission circuit 23A to start transmission of a communication command. The communication control unit 26 simultaneously instructs the output level adjustment unit A21 of the output level adjustment unit group 219A to change to output level setting 2. The communication control unit 26 then sequentially controls the output level adjustment units A22 to A24 of the output level adjustment unit group 219A in accordance with passage detection signals output from the passage detection sensors 40b to 40d along with the movement of the wireless communication medium 10a.

When the wireless communication medium 10b subsequently enters the communication area of the wireless communication device 20, the communication control unit 26 which receives the passage detection signal from the passage detection sensor 40a instructs the transmission circuit 23B to transmit a communication command, and simultaneously instructs the output level adjustment unit B21 of the output level adjustment unit group 219B to change to output level setting 2. The communication control unit 26 then sequentially controls the output level adjustment units B22 to B24 of the output level adjustment unit group 219B in accordance with the passage detection signals output from the passage detection sensor 40b to 40d along with the movement of the wireless communication medium 10b.

Whenever the wireless communication medium 10a or 10b enters the communication area of the wireless communication device 20, the communication control unit 26 alternatively instructs the transmission circuits 23A and 23B to transmit the communication commands. Simultaneously, the communication control unit 26 alternatively instructs the output level adjustment units 219A and 219B to change the output level setting.

With the above arrangement and operation, the wireless communication device 20 can accurately communicate with the wireless communication media 10a and 10b along with their movements in the communication area of the wireless communication device 20 by sequentially switching the transmission output levels (the transmission output levels of the communication antennas 218A and 218B) of the output level adjustment unit groups 219A and 219B along with the movements of the wireless communication medium 10a and 10b.

Figure 18:
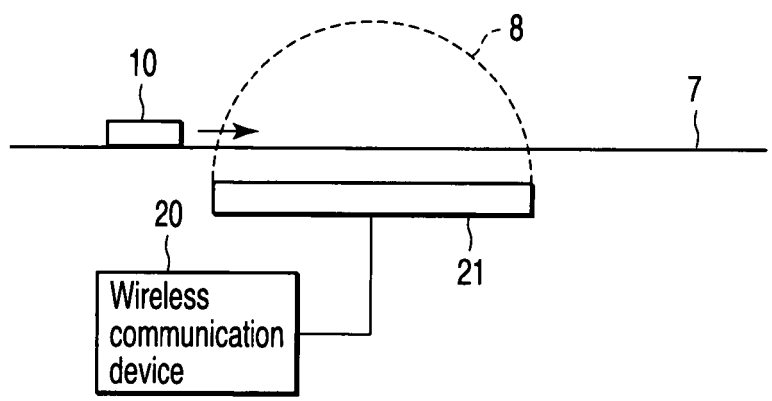
FIG. 18 is a view showing a wireless communication device for explaining the operational effect according to each embodiment.
Figure 19:
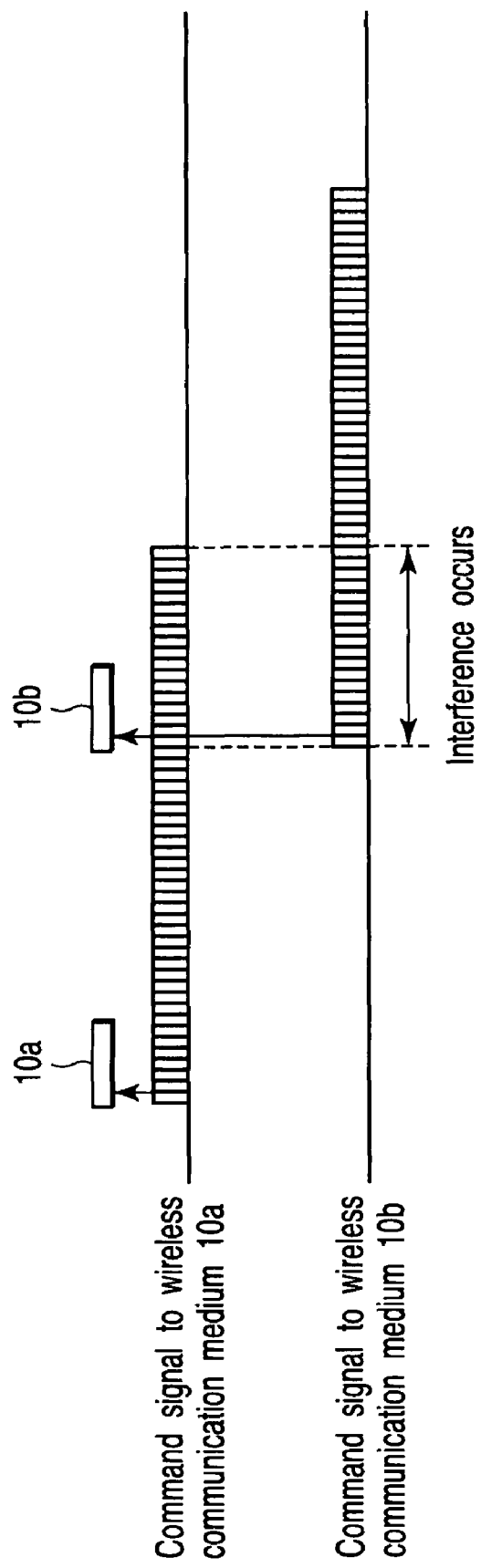
FIG. 19 is a timing chart for explaining a timing for transmitting a polling command to explain the operational effect according to each embodiment.

FIGS. 18 and 19 are views for explaining the operational effect of each embodiment.

FIG. 18 is a view schematically showing another example of a wireless communication device. A wireless communication medium 10 is conveyed through a conveying path 7 at a speed of v [m/s] in the direction of an arrow a in FIG. 18, and a communication antenna 21 of a wireless communication device 20 is arranged midway along the conveying path 7.

When the wireless communication medium 10 conveyed through the conveying path 7 enters a communication area 8 of the wireless communication device 20, operation power is supplied by an electromagnetic wave from the communication antenna 21. When achieving the operation power level of the wireless communication medium 10, the wireless communication medium 10 can receive a polling command from the wireless communication device 20.

The wireless communication device 20 periodically transmits the polling commands (wireless communication signals). When the wireless communication device 20 receives a response from the wireless communication medium 10 which has received the polling command, the communication ends, and the polling command can be transmitted again.

When such wireless communication device is applied to a medium processing apparatus or the like which sequentially processes wireless communication media at high speed to read data and the like from a wireless communication media, a problem occurs as shown in FIG. 19. That is, when a wireless communication medium 10b enters the communication area 8 of the wireless communication device 20 while transmitting a command to the wireless communication medium 10a which has entered the communication area 8 of the wireless communication device 20, two signals (commands) interfere with each other, thereby disabling normal transmission to the first and second wireless communication media. As a result, the wireless communication media continuously conveyed at high speed cannot be appropriately processed.

In the embodiments explained with reference to FIGS. 1 to 17, such problem can be solved, and a wireless communication medium can be continuously processed at high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication device which wirelessly communicates with a moving, wireless communication medium, comprising:
 a position detection unit configured to detect a position of the wireless communication medium in a moving path;
 a control unit configured to control communication based on a detection signal from the position detection unit;
 a communication antenna arranged along the moving path of the wireless communication medium, and configured to wirelessly communicate with the wireless communication medium; and
 a magnetic field control coil group which includes a plurality of magnetic field control coils arranged between the communication antenna and the moving path of the wireless communication medium at predetermined intervals to control a magnetic field from the communication antenna,
 wherein the control unit controls operations of the plurality of magnetic field control coils based on the detection signals from the position detection units.

2. A device according to claim 1, wherein a length of the communication antenna is defined in accordance with a moving speed of the wireless communication medium, and a time required for communication processing with the wireless communication medium.

3. A device according to claim 1, wherein the communication antenna is a loop antenna.

4. A device according to claim 1, wherein the communication antenna is a coaxial cable.

5. A device according to claim 1, wherein the plurality of magnetic field control coils are loop coils which are constituted by a plurality of turns to increase a generated magnetic field, and separated from each other by a predetermined distance to prevent the loop coils from combining.

6. A medium processing apparatus which conveys a wireless communication medium based on identification information stored in the wireless communication medium, comprising:
 a position detection unit configured to detect a position of the wireless communication medium in a moving path;
 a control unit configured to control communication based on a detection signal from the position detection unit;
 a communication antenna arranged along the moving path of the wireless communication medium, and configured to wirelessly communicate with the wireless communication medium; and
 a magnetic field control coil group which includes a plurality of magnetic field control coils arranged between the communication antenna and the moving path of the wireless communication medium at predetermined intervals to control a magnetic field from the communication antenna,
 wherein the control unit controls operations of the plurality of magnetic field control coils based on the detection signals from the position detection units.

* * * * *